INVENTOR.
JOHN W. PEARSON
BY
Carpenter, Abbott, Coulter & Kinney
ATTORNEYS

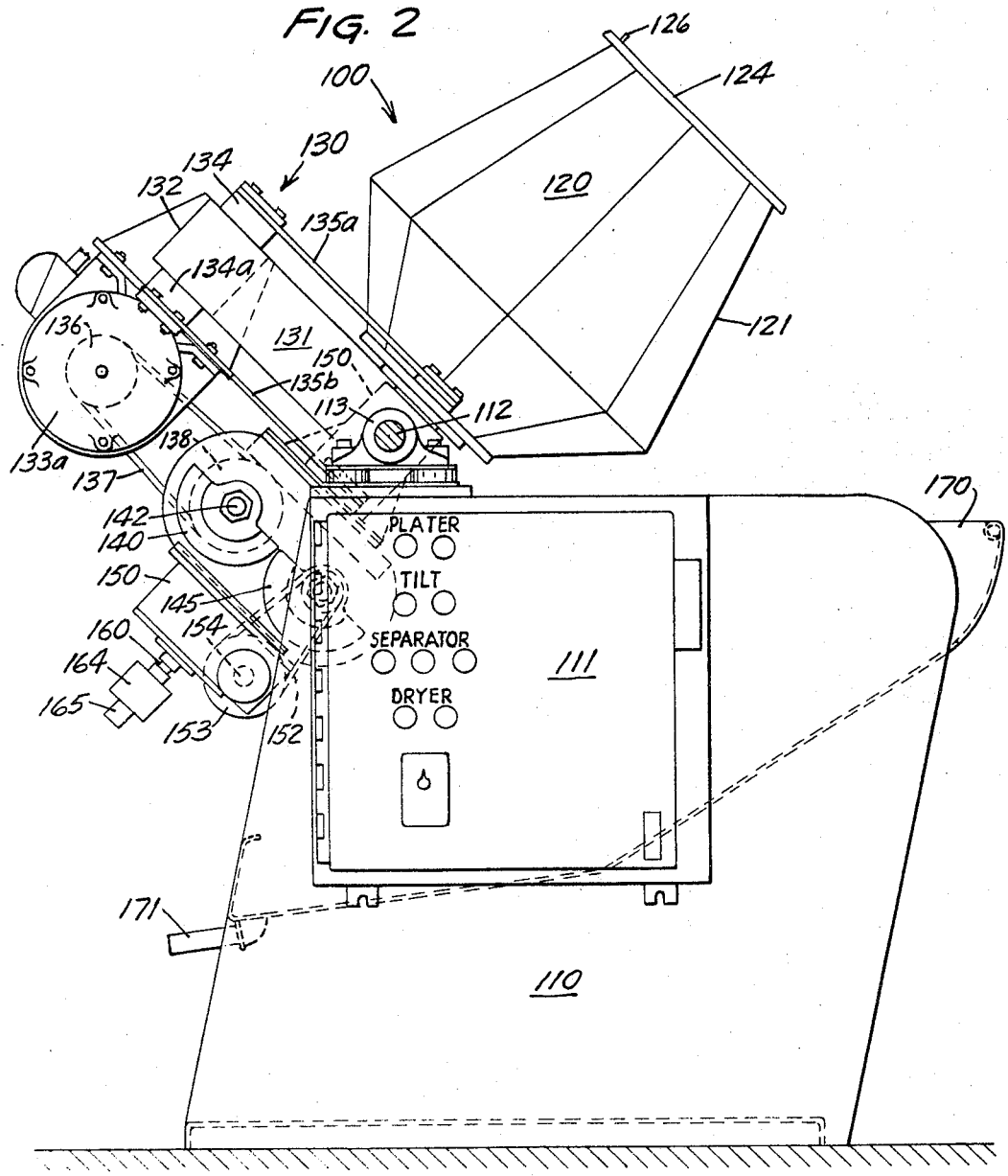

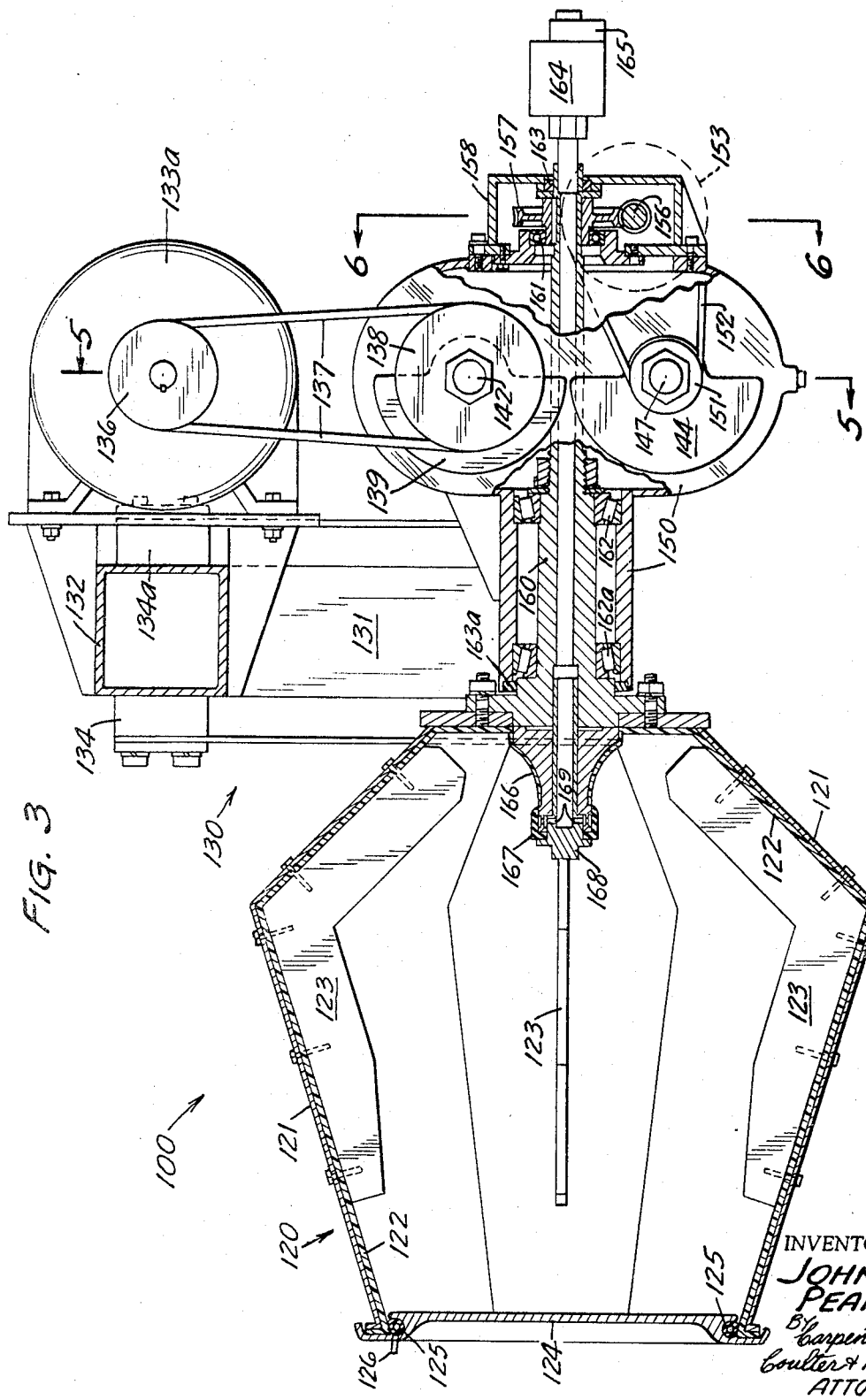

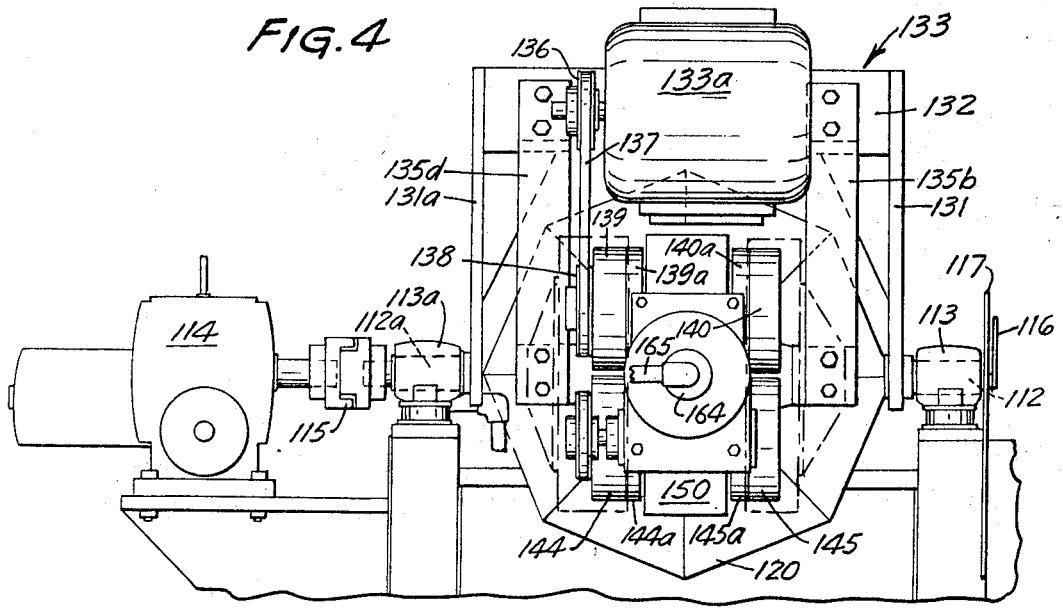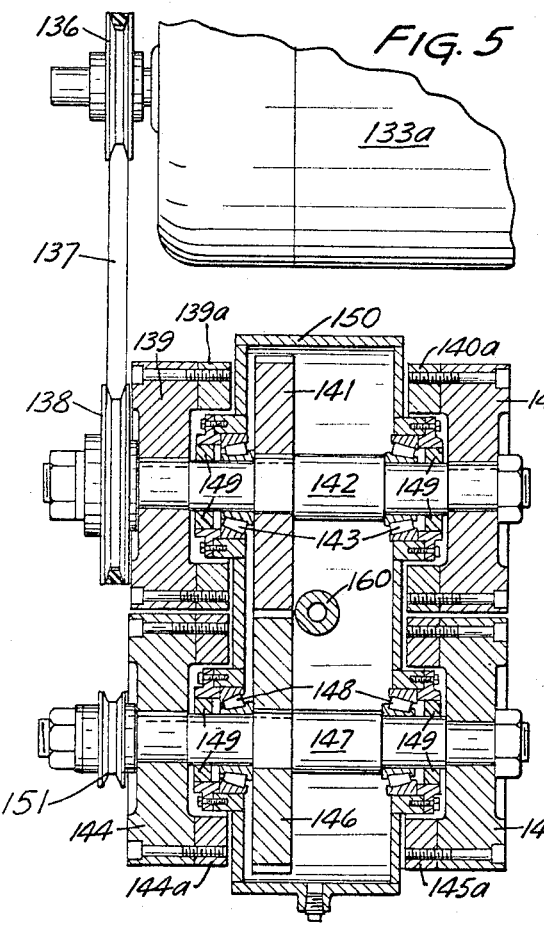

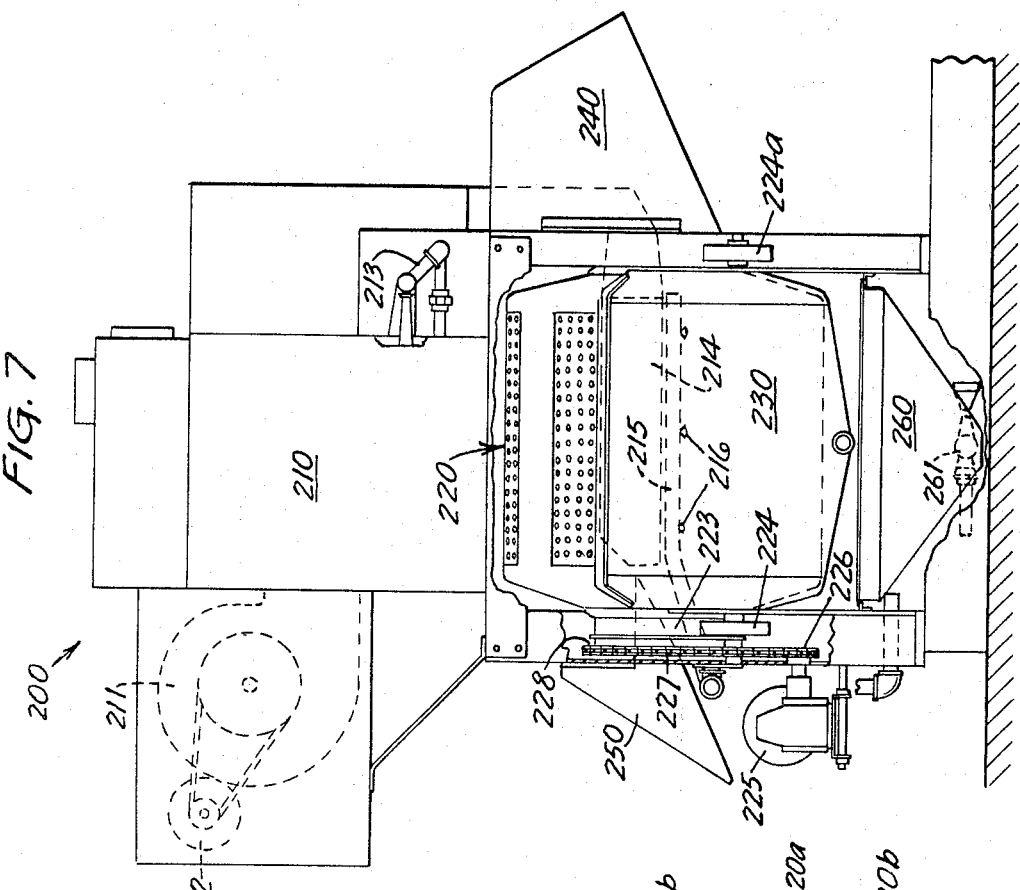
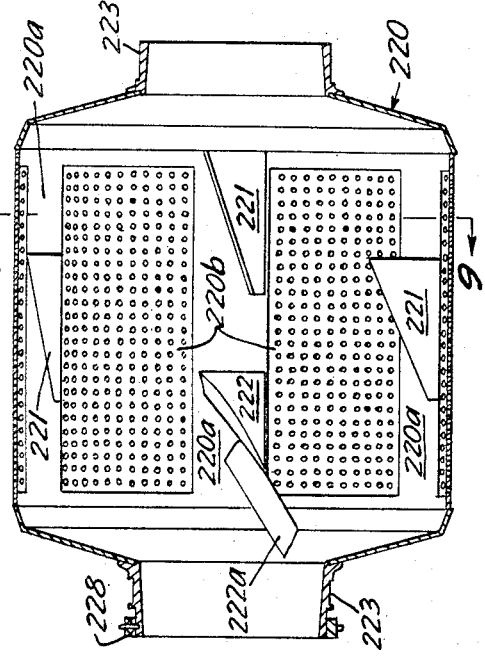
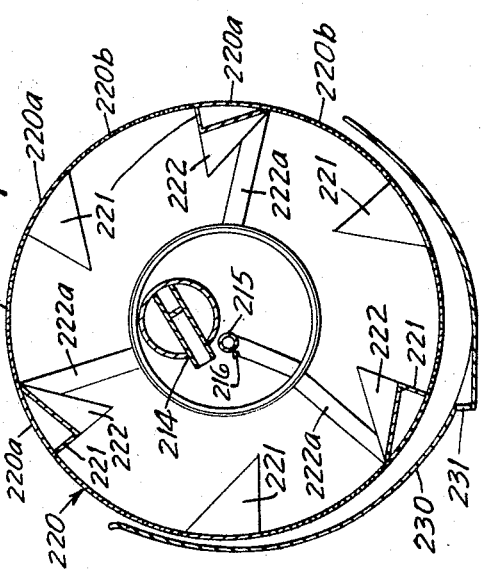
INVENTOR.
JOHN W. PEARSON
BY
Carpenter, Abbott, Coulter + Kinney
ATTORNEYS

United States Patent Office 3,442,691
Patented May 6, 1969

3,442,691
SURFACE TREATING OF ARTICLES BY ROTATING AND RECIPROCATING THE TREATMENT CONTAINER
John W. Pearson, Mendota Heights, Minn., assignor to Minnesota Mining and Manufacturing Company, St. Paul, Minn., a corporation of Delaware
Continuation of application Ser. No. 312,220, Sept. 27, 1963. This application Jan. 23, 1968, Ser. No. 701,014
Int. Cl. B05c 3/08, 3/04; B01f 9/02
U.S. Cl. 117—109     3 Claims

ABSTRACT OF THE DISCLOSURE

Mechanical plating operations are carried out in a container which is simultaneously slowly rotated and rapidly axially reciprocated. The container may be mounted at one end of a cantilevered leaf spring, a single motor simultaneously rotating the shaft and driving eccentric weights which sinusoidally deflect the spring. The plated parts, liquid, impact media, and other contents of the barrel may be discharged into one end of an operatively connected open-ended separating or post-treating drum, which tumbles the parts when rotated in one direction and discharges them from the other end when rotated in the opposite direction.

---

This is a continuation of application Ser. No. 312,220, filed Sept. 27, 1963, and now abandoned.

This invention relates to apparatus and means for subjecting the surface of small objects to treatment with solid and/or liquid treating materials. In a presently preferred form it relates to a method and means for mechanically applying metallic coatings to the surface of small metal objects; accordingly, the invention will be illustratively described with particular reference to this specific utility.

The broad principles of mechanical plating are well-known. Objects to be mechanically plated are generally cleaned, degreased, etched for the acceptance of a plating anchor coating (usually of a ductile metal such as copper), anchor coated in a coating bath, and mechanically plated with a ductile metal, usually zinc, or zinc alloy; they are then separated from the mechanical plating media, washed, optionally subjected to some post-treatment (e.g., chromate coating), and dried. In some instances, of course, one or more of the pre-treating and/or post-treating procedures may be dispensed with.

In the actual mechanical plating operation, the objects to be plated are tumbled in a barrel with small particles of plating metal, a plating promoter, and, preferably, small impact media, generally in the presence of a liquid carrier. Plating depends on a random squashing of individual metal particles on the surface to be plated under the impacting force of the media and/or the other objects, and the rate of plating is dependent to a great degree on the forces imparted by gravity. When attempts have been made to accelerate the process by increasing the speed of barrel rotation, centrifugal force holds the parts to be plated against the barrel walls and the rate of plating is actually decreased. The longer the plating operation requires, the greater the number of metal particles which flatten, and weld together before plating, thereby becoming unusable. Particles of harder metals are extremely difficult to plate because of the difficulty in achieving sufficient mechanical force to flatten them.

Separation of the mechanically plated objects from the impacting media and unused metal particles—not to mention cleaning, drying and post-treating—is cumbersome with conventional equipment, requiring separate transportation of the parts between treating stations and employing bulky, expensive equipment. Also, and of considerable practical importance, the pre-treating, plating, and other equipment required for effective mechanical plating occupies considerable plant space. Because of the disadvantages just recited, many plating operations which could benefit from conversion to mechanical plating have been unable to do so.

I have now devised a means and apparatus which is compact, convenient, versatile, and economical, combining the functions of several heretofore required separate and expensive pieces of equipment in an integrated metal finishing center, and making economically feasible the mechanical plating of objects in small lots. With my improved apparatus mechanical plating is carried out more rapidly, in less plant space, with less bulky and expensive apparatus, than by any previous mechanical plating system known to me. Further, with this new apparatus the efficiency with which the small metal particles are plated on the surface of the objects, as well as the efficiency of mechanical plating generally, is greatly increased.

In the practice of my invention, I provide a complete metal finishing center in a single apparatus and combine in two operably interconnected units all of the pre-treating, plating, and post-treating procedures necessary to a complete mechanical plating operation. The first unit comprises a pre-treating and plating barrel and the second unit comprises a post-treating and separating drum. Once placed in the plating barrel, parts may be cleaned, degreased, etched, anchor coated, and mechanically plated without physical removal therefrom. The parts may then be transferred by the plating barrel directly into the separating drum, where plated parts and plating media may be separated from one another, the media returned to the plating barrel, and the parts subjected to such post-treating procedures as desired and then discharged, all without further transfer of the parts or handling of separated media.

The plating barrel is so mounted and arranged that is is not only capable of rotary motion but is also capable of extremely rapid, short-stroke, essentially axial, vibratory, reciprocating motion to provide superior cleaning action and more rapid plating. The interior construction of the barrel is such that turbulence is present essentially throughout during rotation; additionally, fluids may be pumped into and removed from the barrel, while yet permitting the barrel to serve as a materials handler in transferring its contents to the second unit of the apparatus.

The second unit of the apparatus is essentially a generally horizontally disposed sieve-like drum which, as it rotates, causes liquids and small solid particles to pass therethrough and large solid objects to be retained. This unit also includes auxiliary heating and/or air moving apparatus, so that in one aspect of its operation it constitutes a parts dryer. The interior of the separating barrel is provided with a unique blade arrangement which not only tumbles the parts to constantly expose fresh surface areas, but also acts to expel the post-treated parts from the drum for packaging.

As will be apparent from the foregoing, this invention greatly reduces the amount of equipment and the separate handling of materials required by conventional mechanical plating operations. A preferred form of my invention is illustrated in the accompanying drawing and will be more particularly described with reference thereto.

FIGURE 2 is an enlarged side elevational view of the pre-treating and plating unit and its mounting, again from the operator's side;

FIGURE 3 is a greatly enlarged view, partly in cross-section, of the mounting and operating assembly for the pre-treating and plating barrel from the back, or side opposite the operator's, side;

FIGURE 4 is a view from the back of the plating barrel viewed substantially along the plane of line 4—4 of FIGURE 1;

FIGURE 5 is a view of the plating barrel reciprocating assembly, largely in cross-section, taken substantially along the plane of section line 5—5 of FIGURE 3;

FIGURE 6 is a view of the worm gear assembly, which controls the rotation of the plating barrel, this view being largely in cross-section and taken along the plane of section line 6—6 of FIGURE 3;

FIGURE 7 is a view of the post-treating or separating drum, partially broken away to enhance clarity, as seen from the operator's side;

FIGURE 8 is a view in axial cross-section of the rotating drum employed in the second unit; and FIGURE 9 is a view in diametric cross-section of the separator drum and surrounding shell in the second unit, taken along the plane of section line 9—9 of FIGURE 8.

Figure 1:
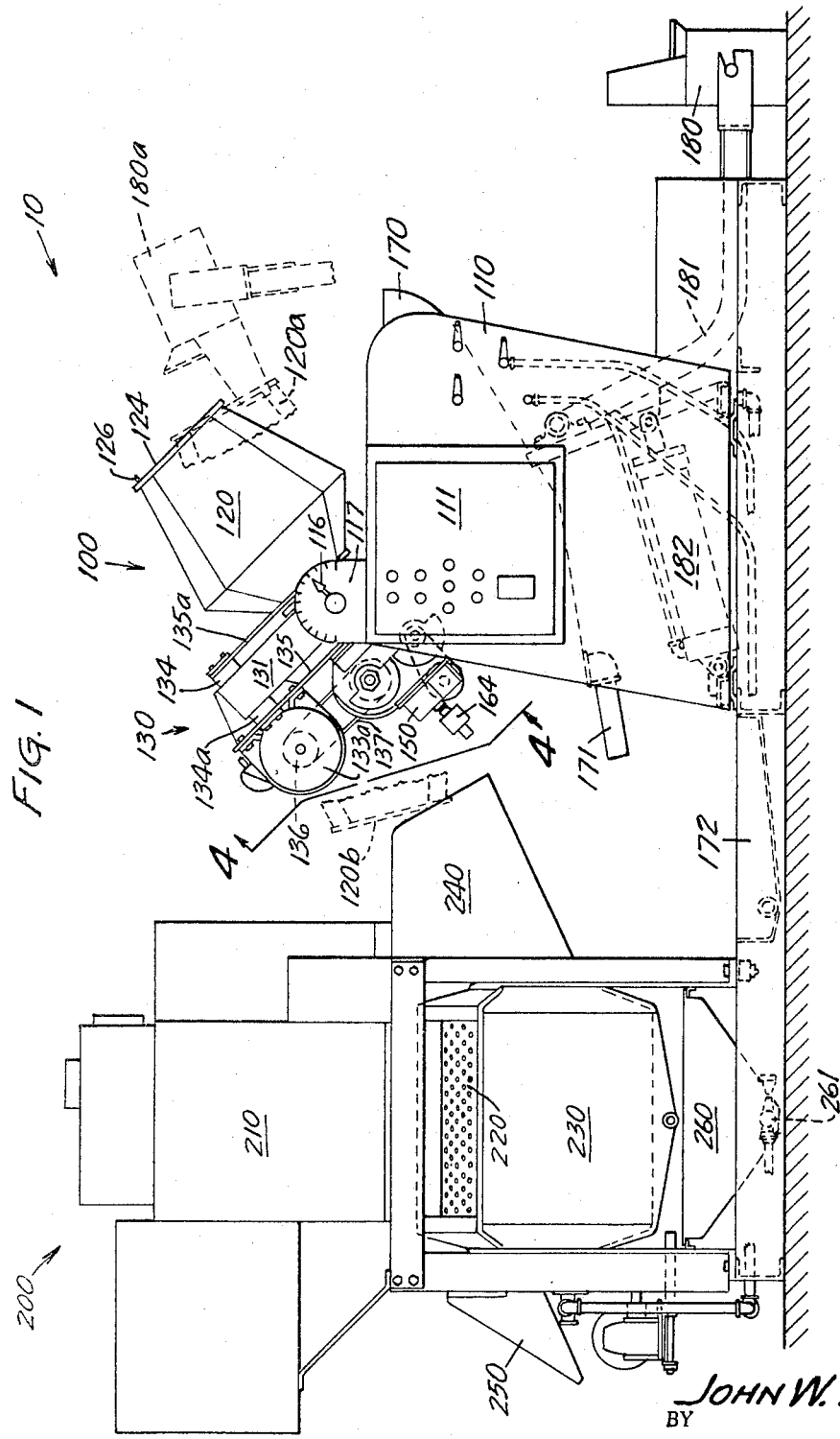
FIGURE 1 is a side view of a treating apparatus embodying the principles of my invention from the front, or operator's, side.

In the drawings, the apparatus is designated in its entirety by the numeral 10, and comprises essentially a pre-treating and plating unit 100 and a post-treating and separating unit 200, the units being operatively interconnected by means which will become apparent as the description proceeds. Structural details of plating unit 100 are illustrated primarily in FIGURES 2–6, and structural details of post-treating unit 200 in FIGURES 7–9. The operation of apparatus 10 in toto is best described with reference to FIGURE 1.

Plating unit 100 comprises a supporting frame 110 swingably carrying thereon drive unit 130, which in turn supports plating barrel 120 and its actuating means. This assembly is so constructed that plating barrel 120 can be swung to position 120a for loading, to position 120b for discharge and to any desired intermediate angle for operation. Pointer 116 notes the attitude of the plating barrel 120 on quadrant 117. Parts can be pretreated, mechanically plated, and transferred to post-treating and separating unit 200 by movement of barrel 120 to discharge position 120b.

Also carried by frame 110 is chute 170, which provides for drainage during rinsing cycles, etc., the lower end of chute 170 being provided with drain 171 leading to drain pan 172. Positioned to the right of frame 110 is loading bucket 180, mounted on lifter arm 181, which in turn is actuated by hydraulic cylinder 182. Loading bucket 180 provides a convenient means for elevating material to be charged to barrel 120, as shown in dotted lines at 180a, and also facilitates measuring the proper ratio of ingredients.

Post-treating unit 200 comprises air heater-circulator 210, open ended sieve-like separating drum 220 and shell 230. Contents of plating barrel 120 are charged to drum 220 through input chute 240 by swinging barrel 120 counterclockwise to dumping position 120b. Located beneath shell 230 is pan 260, in which the material screened or otherwise separated from the treated objects in drum 220 is collected. At the bottom of pan 260 is aspirator 261, which provides a means for withdrawing the contents of pan 260 and transferring it through a hose or pipe (not shown) to barrel 120 for further use. The finished product of unit 200 is then discharged from drum 220 through chute 250.

Referring now particularly to FIGURES 2–4 inclusive, drive unit 130 is pivotally attached to frame 110 by means of trunnions 112 and 112a respectively journaled in bearings 113 and 113a and firmly attached to the free ends of arms 131 and 131a of yoke 133 (FIG. 4). At their opposite ends suspension arms 131–131a are connected through cross member 132 to complete U-shaped yoke 133. Gearhead motor 114 is connected to trunnion 112a by coupling 115 and provides a means of swinging yoke 133, and equipment supported thereby, to any desired angle. attached to the upper and lower surfaces of cross member 132 are spacers 134 and 134a, to which are firmly attached one end of downwardly depending suspension leaf springs 135a, b, c, and d.

To the free ends of leaf springs 135a–135b is bolted gear case-housing 150, within which lies hollow shaft 160, journaled in bearings 161, 162 and 162a and provided with upper and lower coil seals 163 and 163a. At the lower end of shaft 160 is rotating union 164 and connection 165 through which water, steam, or other fluid may be introduced into barrel 120 via the interior of shaft 160. Annular pedestal 166 is firmly seated against the interior closed end of barrel 120, and held in position by bolt 168, which is threaded into the interior of hollow shaft 160. Extending radially through the outer end of bolt 168 are hollow passages 169, ordinarily kept covered and sealed by rubber cup valve 167, which is held in place by bolt 168. When sufficient fluid pressure exists in the interior of shaft 160, cup valve 167 spreads slightly to permit the fluid to be injected into the interior of barrel 120. Cover 124 closes the mouth of barrel 120, protruding thereinto, and being snugly peripherally sealed by gasket 125, which is inflatable through valve 126. Cover 124 may, if desired, be provided with baffles which permit the escape of steam but which prevent accidental discharge of parts and/or impact media.

Barrel 120 comprises metal shell 121 provided with a rubbery chemical-resistant, e.g., neoprene, lining 122. Lifter bars 123 are mounted at spaced intervals along the interior of barrel 120 to aid in blending the contents thereof as barrel 120 is rotated. Lifter bars 123 are shown aligned in a plane radial to the axis of barrel 120; additional mixing action is obtained if they are mounted helically about the inner surface of barrel 120. Preferably, to prevent damage to parts being plated and to prevent plating of the barrel interior, lifter bars 123 are formed of or coated with a rough inert plastic such as high impact strength polypropylene.

Drive assembly 130, which provides both rotary and axially reciprocal motion to shaft 160 and barrel 120, functions in the following manner: mounted on cross member 132 of yoke 133 is motor 133a having drive pulley 136 connected by drive belt 137 to pulley 138. Pulley 138 is mounted on shaft 142, which also carries rotatable eccentric weights 139 and 140 and auxiliary weights 139a and 140a. Shaft 142 is geared to shaft 147 so that the two shafts rotate in opposite directions at the same speed. Shaft 147, which also carries eccentric weights 144 and 145, auxiliary weights 144a and 145a, and pulley 151, is connected through drive belt 152 to pulley 153 mounted on shaft 154 of worm 156, which in turn rotates shaft 160. It will be seen that operation of motor 133a causes mutually opposite rotation of eccentric weights 139–140 and 144–145, and, since the thrust resulting from the eccentricity cancels out except when the heavy side of each weight is moving parallel to shaft 160, the result is to impart simple harmonic motion to shaft 160, causing it to reciprocate substantially axially.

Cantilevered leaf springs 135a–135d inclusive provide a sufficiently rigid support for housing 150 and its contents to maintain a predetermined attitude for barrel 120. At the same time springs 135a–135d are sufficiently resilient to yield under the reciprocatory forces generated by the rotation of eccentric weights 139–140 and 144–145 to permit a peak-to-peak oscillation of about 5–15 millimeters. Springs 135–135d may be made from conventional spring steel, but desirably are made from such fatigue- and corrosion-resistant material as the glass filament-reinforced resin described in Nelson U.S. Patent 2,969,971. Care should be taken to see that the rate of reciprocation does not closely approximate the resonant frequency of springs 135a–135d in order both to limit the amplitude of movement of barrel 120 and to render the system less dependent upon the load of the contents of barrel 120.

When barrel 120 is of the 8-sided "tulip" shape illustrated, it is typically inclined at an angle of 40–45° to the horizontal and reciprocated at about 1000 cycles per minute through a peak-to-peak amplitude of 5/16-inch while being rotated at about 100 surface feet per minute, thereby imparting forces on the order of 5 to 10 times that of gravity to the contents of drum 120. Plating time is thus greatly reduced, often to ½ to ⅕ that required in the absence of reciprocation, with a well-consolidated plate. Perhaps even more important is the fact that the parts to be plated may have intricate shapes, the relatively violent action serving both to impact metal particles into recesses and internal threads and to provide for the washing out of media which might otherwise retard plating.

A suitable range of the amplitude of reciprocation has been found to be between ⅛ inch and ½ inch. Since, however, the "g" forces generated are lineally related to the amplitude and to the square of the frequency, some compromise is possible. Frequency in the range of 250–2500 cycles per minute may be employed for various purposes. To illustrate, relatively large 1- or 2-lb. castings may be subjected to reciprocative frequencies at the high end of the range to prevent their damaging each other, while smaller objects may be advantageously subjected to lower frequencies. Likewise, a rotative speed on the order of 40 surface feet per minute is required to keep the parts from settling in the treating barrel, the primary reason for rotation. Metal stampings or other parts having thin portions tend to abrade excessively at high speeds, but short screws or like objects may be tumbled at speeds of 400 s.f.p.m. or higher.

It has also been found that the use of unit 100 greatly reduces degreasing and pre-plating cleanup time; the parts, impact media and cleaning solution may be placed in barrel 120, the rotary-reciprocatory action rapidly removing corrosion, scale, and carbon smut without the hydrogen embrittlement which often results from conventional acid pickling operations. During this operation live steam may be introduced through hollow shaft 160, emerging into barrel 120 through passages 169. Since the entire cleaning operation is rapid and requires only about 10–15 minutes, and since only small amounts of cleaning solution are required, it is possible to use relatively unstable systems which are too costly and too short-lived for conventional dip tank cleaning. Following cleanup, a preliminary strike, or anchor, plate of copper may be applied in barrel 120, the rotary-reciprocatory action aiding in achieving uniform coverage.

As indicated, preferred rates of reciprocation are on the order of 250–2500 cycles per minute. Higher frequencies can be employed, but if, e.g., 3000 cycles per minute is exceeded, the resultant plate is thin and tends toward flakiness. The exact frequency for a specific application is dependent upon the promoter, the metal being plated, and perhaps other factors. Thus, relatively soft plating metals like cadmium or lead require less energy input than such metals as zinc.

In FIGURE 5 the eccentric gear arrangement is shown in cross-section. Eccentric weight 140 and auxiliary weight 140a are mounted on one end of shaft 142, while on the opposite end are mounted eccentric weight 139 and auxiliary weight 139a, together with pulley 138. Shaft 142 is journaled in bearings 143, mounted in oil-filled housing 150, and provided with oil seals 149. Mounted within housing 150 on shaft 142 is helical gear 141, which drives second helical gear 146. Helical gear 146 is in turn mounted on shaft 147 journaled in bearings 148 and provided with oil seals 149, bearing eccentric weight 144 and auxiliary weight 144a on one end and eccentric weight 145 and auxiliary weight 145a on the other end. Shaft 147 also bears pulley 151, for driving the worm unit shown in FIGURE 6.

FIGURE 6 shows driven pulley 153 mounted on shaft 154, which is journaled in bearings 155 and has, as its central portion, worm configuration 156. Worm 156 drives gear 157, which is directly connected to shaft 160.

Referring now to FIGURES 7, 8 and 9, it will be noted that post-treating unit 200 comprises air heater-circulator section 210 and separator drum 220. Gas burner 213 is included in heater-circulator portion 210, fan 211 being driven by motor 212 to force air through heater-duct 214, which opens into the interior of separator drum 220. Also positioned within the interior of drum 220 is fluid supply pipe 215, having discharge nozzles 216 to aid in washing, cleaning, or otherwise treating the contents of drum 220. Annular rims 223 and 223a respectively surround the discharge end and input end of drum 220, and are supported by trunnions 224 and 224a. (The rear roller in each pair cannot be seen in the drawings.) Mounted axially outward of one of the two rims 223 is annular sprocket gear 228 driven by chain 227, which in turn is driven by drive gear 226 mounted on reversible gear head motor 225.

Referring now to FIGURES 8 and 9, which illustrate the specific construction of drum 220, it will be noted that the periphery is made up of alternate solid, or imperforate, panels 220a and perforate panels 220b. Mounted on the radially inner faces of solid panels 220a are projections 221 and 222, which combine to form interrupted screw flights. Projections 221 are roughly right triangular cross-section truncated pyramids, one right angle-defining side of the pyramid lying in an approximately radial plane at an angle to the axis and the other right angle-defining side conforming to the inner surface of panel 220a. It will thus be seen that projections 221 have one exposed surface which lies in a radial plane and a hypotenuse surface which intersects the inner surface of panel 220a along a line parallel to the axis. Projections 222 are substantially similar in configuration to projections 221, with exception that they are provided at the discharge end of drum 220 with scooplike extensions 222a. The mechanical effect of the arrangement just described is such that when drum 220 is rotated so that the hypotenuse face of the projections lead, the drum functions as a tumbling and mixing unit. When, however, drum 220 is rotated in the opposite direction the contents thereof are in effect screwed to the discharge end of drum 220, toward which the narrow end of projections 221 and 222 point, scooplike extensions 222a serving to move the contents of drum 220 into discharge chute 250. It will be appreciated that the preceding geometric description has been somewhat simplified as an aid to understanding. Variations in the exact configuration of projections 221 and 222 may be desirable; e.g., the right angle of projections 221 and 222 may slightly exceed 90° to aid in part retention during discharge.

In operation, when a load of plated parts, impact media, unused metal particles, and promoter is supplied to drum 220 and drum 220 then rotated to insure tumbling action (i.e., so that the radial plane of projections 221 and 222 lead), the liquid and relatively small particles fall through the perforations in panels 220b, the larger plated objects remaining behind in the drum. This separating effect is enhanced and the plated objects rendered cleaner by supplying steam and/or water through jets 216, shell 230 serving to prevent spattering and further serving to direct the separated material through openings 231, where it is collected in pan 260. When the parts have been sufficiently cleaned, they are dried with hot air supplied through heating duct 214 and discharged through chute 250, as previously described. If desired, additional fluid treatments to give the parts color, luster, portection against corrosion, or the like can be introuced through jets 216. Another convenient way to subject parts to a dichromating or other liquid treatment is to introduce such a liquid through opening 221, allowing it to rise through the perforations in drum 220 while shell 230 serves as a container. Thus a tank of treating solution may be wheeled to sub-unit 220, connected to opening 221 with a hose, raised to let the liquid flow into drum 220 by gravity, and lowered after treatment is completed to let the liquid return to the tank.

Although this invention has been described with particular reference to a commercial mechanical plating operation, it will be readily apparent that numerous variations may be effected without deviating from the spirit of the principles taught herein. For example, unit 100 may be used in a conventional barrel tumbling operation, parts having rough or corroded surfaces being placed, together with tumbling media in barrel 120, and the rotary-reciprocatory operation carried out in the manner described. Similarly, unit 100 can be employed to blend powders, finally divided material such as abrasive granules, slurries of various types, and so on.

Likewise, although unit 200 as shown and described is particularly suited for the purposes discussed, it can be readily adapted for other applications. Thus, since it provides a convenient means for both tumbling the contents of drum 220 for a desired length of time and discharging the contents by simply reversing the directon of rotation, employment of an imperforate container makes this unit suitable for conventional tumbling operations. Similarly, it may be employed as a dryer for granular, lump, or other discrete material.

What I claim is:

1. A method of simultaneously preparing a large number of uniformly treated relatively small objects, comprising the steps of: providing a container which is rigidly mounted on a rotatable shaft in line with the axis of said container, said shaft being carried by a support which is reciprocable parallel to the axis of said shaft while inclined at an angle of 40 to 45° to the horizontal, placing in said container the objects to be treated and material for treating said objects, slowly rotating said shaft to impart a peripheral surface speed to said container of about 40–400 surface feet per minute while simultaneously rapidly reciprocating said support through short distances at about 250–2500 cycles per minute, continuing the rotation and reciprocation until said objects have obtained the desired degree of treatment with said material, and separating said objects from said treating material.

2. A method of simultaneously preparing a large number of clean, dry mechanically metal-plated small metal objects comprising the steps of providing a generally cup-shaped container which is rigidly mounted on a rotatable shaft in line with the axis of said container, said shaft being mounted on a support therefor so as to permit axial reciprocal movement at an angle of 40–45° to the horizontal, placing in said container said metal objects, liquid carrier, metal-plating promoter chemical, minute particles of plating material, and impacting media, closing said container, slowly rotating said shaft to impart a peripheral surface speed of about 40–400 surface feet per minute to said container while simultaneously rapidly reciprocating said shaft at about 250–2500 cycles per minute, continuing the rotation and reciprocation until said objects have obtained the desired degree of planting with said plating metal, re-opening said container and discharging the contents thereof into a hollow generally cylindrical rotation drum having a multiplicity of perforations smaller than said objects but larger than said metal particles and impacting media particles, rotating said drum to separate the plated objects from said particles and media, subjecting the contents of said drum to a treating fluid, drying said objects, and removing the treated objects from said drum.

3. A treating unit adapted for use in the mechanical plating of small metal parts comprising in combination: a frame, a generally cylindrical container mounted on said frame so as to permit both axial and rotary movement while inclined at an angle of 40–45° to the horizontal, rotative means operatively associated with said container for slowly rotating said container about its axis at a peripheral speed of about 40–400 surface feet per minute, and reciprocatory means operatively associated with said container for rapidly reciprocating said container at about 250–2500 cycles per minute substantially parallel to its axis.

References Cited
UNITED STATES PATENTS

| | | | |
|---|---|---|---|
| 1,042,948 | 10/1912 | Morisons | 259—72 X |
| 2,351,453 | 6/1944 | Pearl. | |
| 2,787,978 | 4/1957 | Faerber | 118—19 |
| 3,013,892 | 12/1961 | Songas | 117—109 X |

FOREIGN PATENTS 9,601   3/1905   Great Britain.

ALFRED L. LEAVITT, Primary Examiner.

C. R. WILSON, Assistant Examiner.

U.S. Cl. X.R.

118—418; 259—72